United States Patent
Lawson

(10) Patent No.: US 9,374,018 B2
(45) Date of Patent: Jun. 21, 2016

(54) EFFICIENT INDUCTORLESS AC/DC CONVERTER

(71) Applicant: CogniPower, LLC, Malvern, PA (US)

(72) Inventor: Thomas E. Lawson, Malvern, PA (US)

(73) Assignee: CogniPower, LLC, Malvern, PA (US)

( * ) Notice: Subject to any disclaimer, the term of this patent is extended or adjusted under 35 U.S.C. 154(b) by 0 days.

(21) Appl. No.: 14/598,582

(22) Filed: Jan. 16, 2015

(65) Prior Publication Data

US 2015/0236612 A1    Aug. 20, 2015

Related U.S. Application Data

(60) Provisional application No. 61/940,906, filed on Feb. 18, 2014.

(51) Int. Cl.
*H02M 7/217*    (2006.01)
*H02M 1/08*    (2006.01)

(52) U.S. Cl.
CPC ............. *H02M 7/217* (2013.01); *H02M 1/08* (2013.01); *H02M 7/2176* (2013.01)

(58) Field of Classification Search
CPC ...................................................... H02M 7/217
See application file for complete search history.

(56) References Cited

U.S. PATENT DOCUMENTS

| | | | |
|---|---|---|---|
| 8,933,674 B2 * | 1/2015 | Lee ............. | H02M 7/12 323/222 |
| 2009/0284182 A1 * | 11/2009 | Cencur ............. | H05B 33/0815 315/307 |

* cited by examiner

*Primary Examiner* — Emily P Pham
(74) *Attorney, Agent, or Firm* — Mendelsohn Dunleavy, P.C.; Steve Mendelsohn

(57) ABSTRACT

In at least one embodiment, the invention provides an inductorless AC/DC converter for generating a DC power supply with up to 98% efficiency. That power is suited for running a primary side controller, and for providing mains side switch drive in an isolated AC/DC converter, and also for powering unisolated LED lighting.

9 Claims, 3 Drawing Sheets

EFFICIENT INDUCTORLESS AC/DC CONVERTER

CROSS-REFERENCE TO RELATED APPLICATIONS

This application claims the benefit of the filing date of U.S. provisional application No. 61/940,906, filed on Feb. 18, 2014, the teachings of which are incorporated herein by reference in their entirety.

BACKGROUND

1. Field of the Invention

The present invention is related to electronics and, in particular, to AC/DC conversion.

2. Description of the Related Art

Efficient power converters almost always require inductors or transformers. These components can be the physically largest and most costly parts in a power converter. Inductors and transformers are also difficult or impossible to include in an integrated circuit. There is a need for physically small, efficient, AC/DC converters for driving LEDs and other unisolated loads, and for driving the mains side power switches of power converters.

DETAILED DESCRIPTION OF THE DRAWINGS

Figure 1:
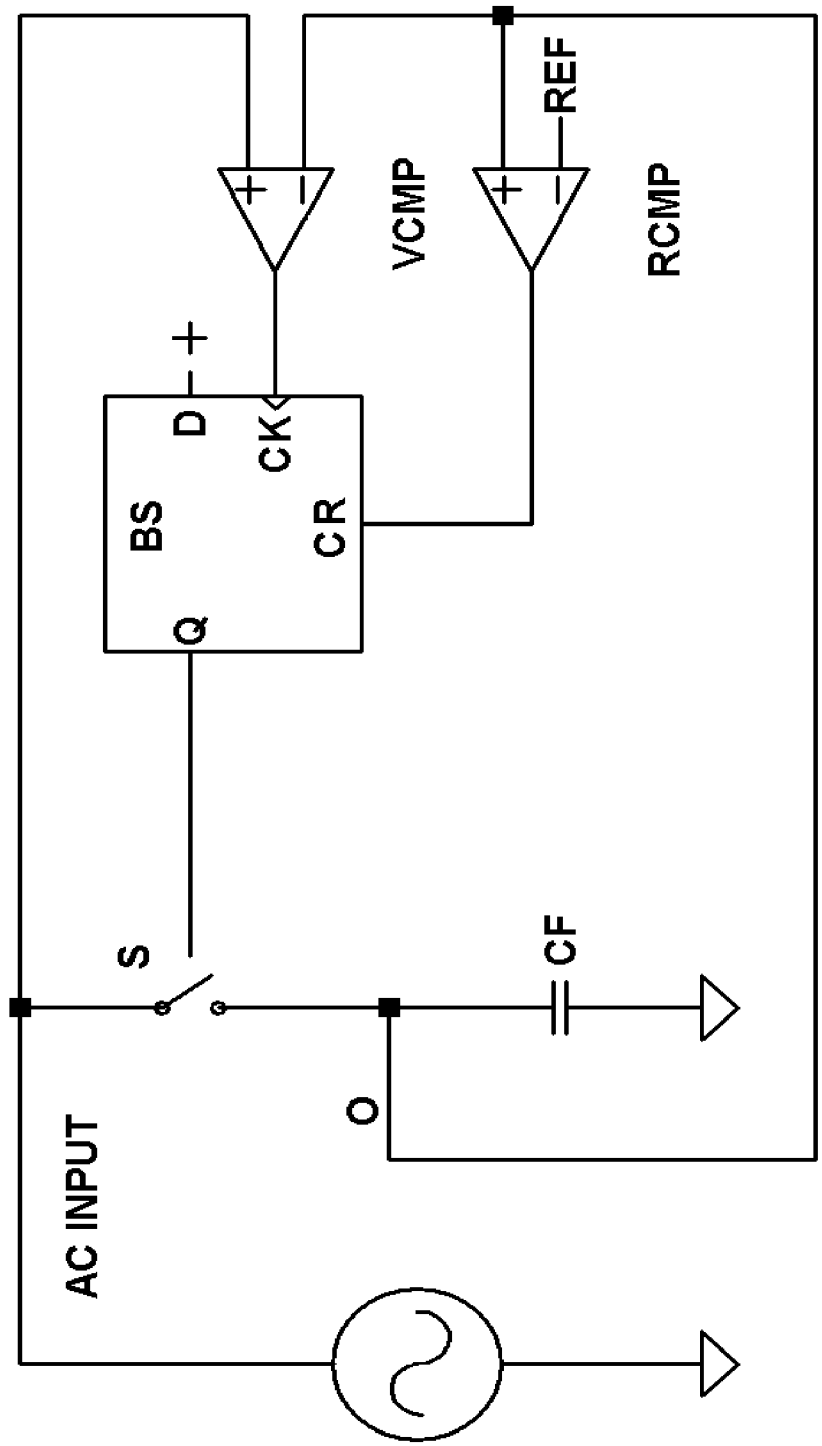
FIG. 1 shows an inductorless AC/DC converter with a voltage output.

The power converter of FIG. 1 accepts an AC INPUT and produces a regulated DC output, O. A switch, S, can be a silicon FET or bipolar transistor in series with a diode, or it can be a bipolar blocking switch such as a GaN FET. Switch S acts as a controllable synchronous rectifier. The output of bistable, BS, controls switch S. A positive edge from a comparator, VCMP, clocks a logic one, +, into bistable BS, thereby turning on switch S at the moment a rising input voltage crosses the output voltage. A regulation comparator, RCMP, resets bistable BS through the clear input, CR, when the output voltage, O, reaches a reference level, REF. The output is filtered by capacitor CF. Comparators VCMP and RCMP function as part of a controller for the power converter of FIG. 1.

A bistable has two states: set and reset. In the embodiment of FIG. 1, when bistable BS is set, switch S is turned on (i.e., closed) and, when bistable BS is reset, switch S is turned off (i.e., opened). In an alternative embodiment, bistable BS can be configured to (i) turn on switch S when bistable BS is reset and (ii) turn off switch S when bistable BS is set. In that alternative embodiment, a positive edge at VCMP would reset BS, and a high output from RCMP would set BS. The function would then be otherwise identical.

Figure 2:
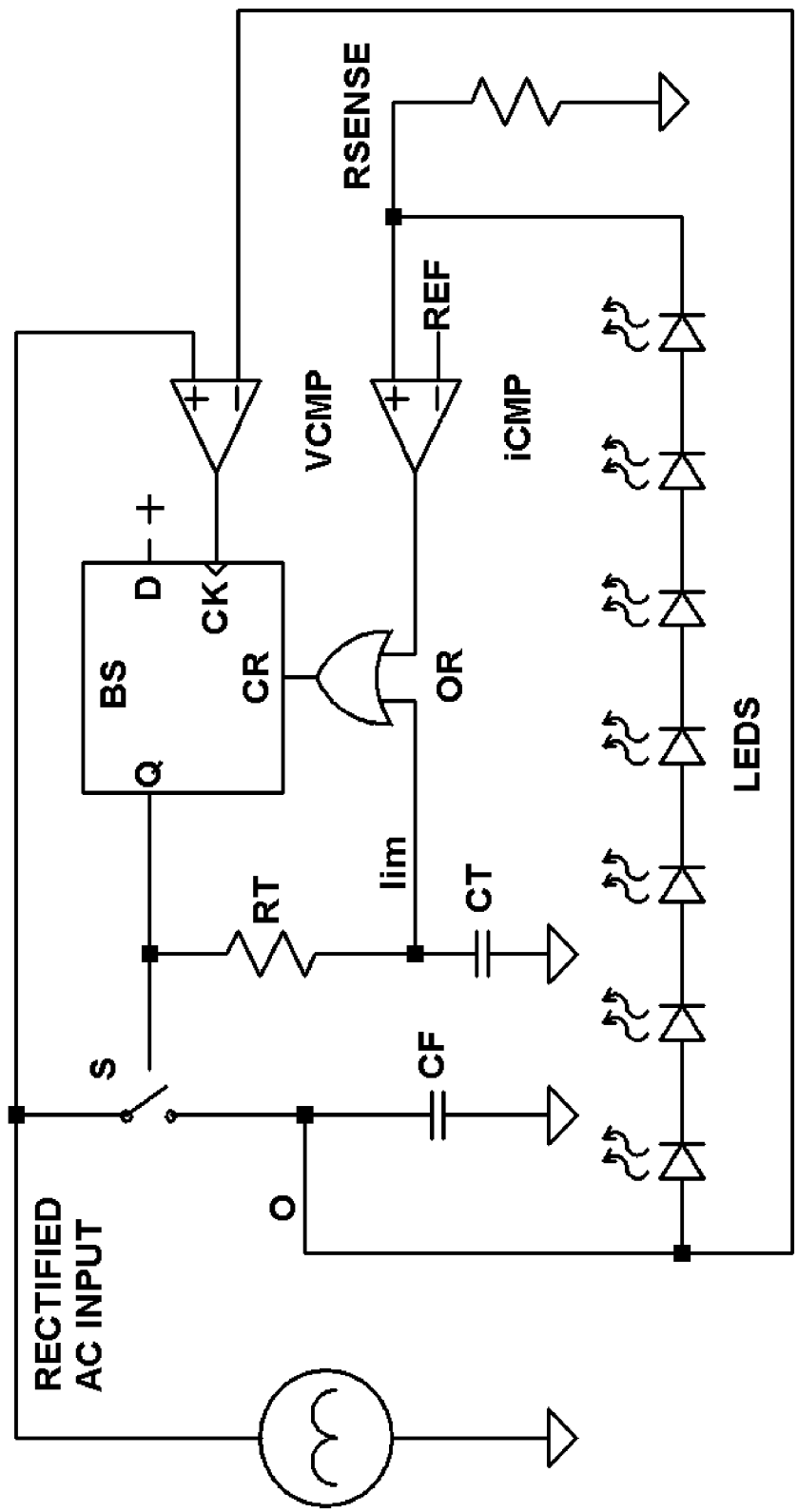
FIG. 2 shows an inductorless AC/DC converter for driving an LED string.

VCMP of FIG. 1 will generate a positive edge once per AC input cycle. With a rectified AC input, it would generate a positive edge twice per AC input cycle. More frequent positive edges will reduce output ripple. Because the switch S always turns on with zero volts across its terminals, there is a minimum of energy loss associated with the switching action. Simulations show that power converters of this type can be over 98% efficient. Variations obvious to those skilled in the art include a negative output version and a version accepting rectified AC input voltage, such as is shown in FIG. 2. For a negative output, switch S would be turned on at the moment a falling input voltage crossed the output voltage, and turned off when the output was less than or equal to the reference.

The inductorless power converter of FIG. 2 is similar, except that it regulates a current output, instead of a voltage output. The input is shown here as a RECTIFIED AC INPUT. The load is shown as seven LEDS in series, such as could be found in an LED light bulb. A sense resistor, RSENSE, provides a voltage proportional to current for comparison with a reference voltage, REF, by comparator iCMP. The comparator, iCMP, resets a bistable, BS, through OR gate, OR, when the current sense voltage reaches the reference voltage, REF. The output is filtered by capacitor CF. Comparators VCMP and iCMP function as part of a controller for the power converter of FIG. 2.

For protection, and for charging capacitor CF at start-up, a current limit is enforced by setting a maximum ON time of switch S. A timing resistor, RT, and a timing capacitor, CT, reset bistable BS through a signal, Ilim, via OR gate, OR, after the maximum ON time, thereby limiting the maximum current. Similar protection could be added to the converter of FIG. 1.

Figure 3:
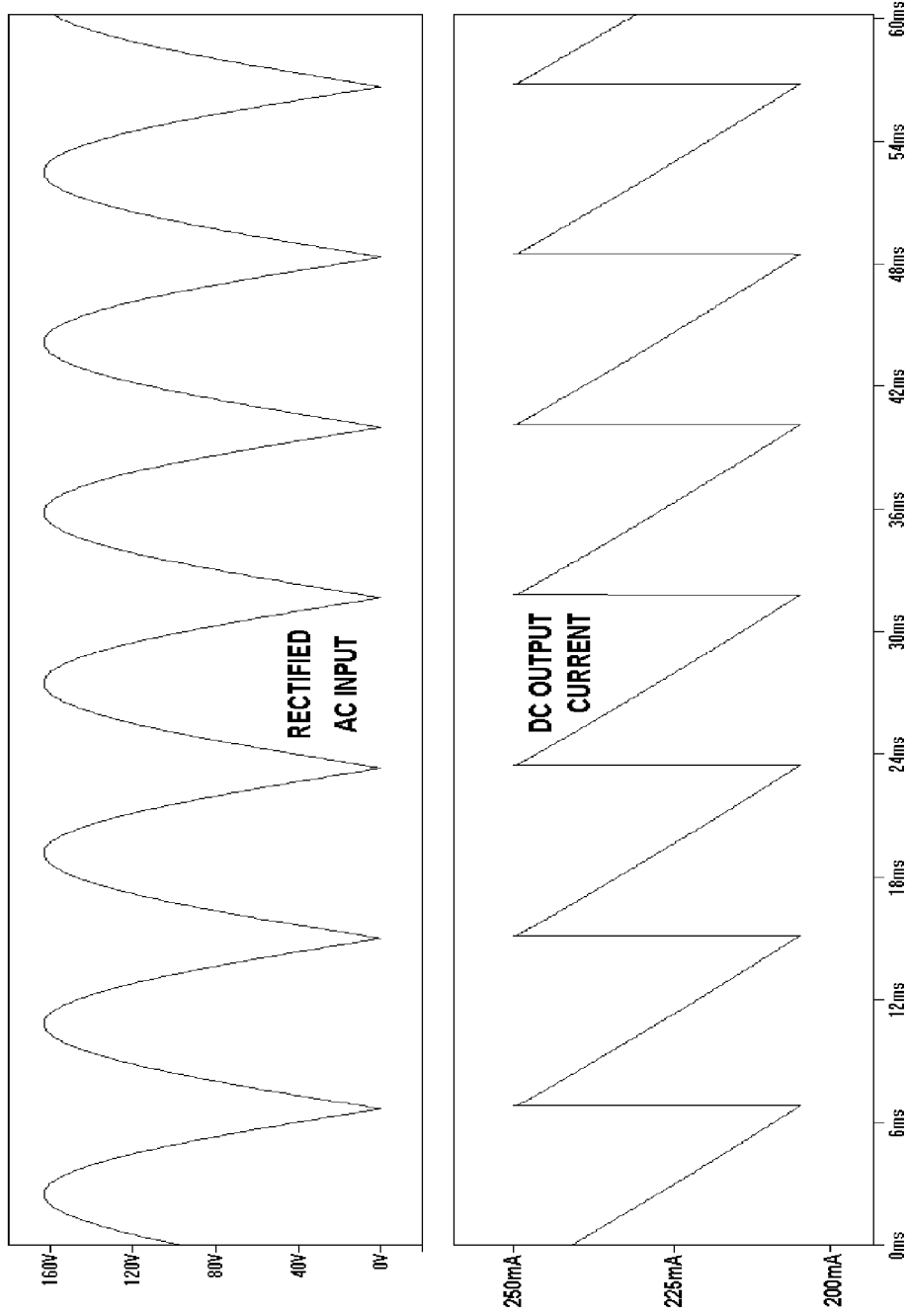
FIG. 3 shows SPICE waveforms illustrating the function of the power converter of FIG. 2.

The waveforms of FIG. 3 were generated by a SPICE simulation of the power converter of FIG. 2. The lower axis shows the output current, DC OUTPUT CURRENT, from point O in FIG. 2. The current rises quickly when switch S turns on, and falls more slowly as the load drains the filter capacitor, CF. As in other power converters, the output ripple can be reduced by using a higher value filter capacitor. The upper axis shows the RECTIFIED AC INPUT, here shown as typical for 115VAC power.

In at least one embodiment, the power converter can provide power for operating mains side switches in AC/DC converters.

At least one embodiment can drive an LED string (FIG. 2).

At least one embodiment accepts a higher frequency AC input for reduced output ripple.

At least one embodiment employs a GaN switch, or other bipolar blocking switch, thereby avoiding the need for input rectification.

At least one embodiment has appropriate polarities reversed for generating a negative output voltage or current.

The input waveform can be a sinusoid, a sawtooth, a triangle wave, or other non-sinusoidal form.

Signals and corresponding nodes, ports, or paths may be referred to by the same name and are interchangeable for purposes here.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non enabled embodiments and embodiments that correspond to non statutory subject matter are explicitly disclaimed even if they fall within the scope of the claims.

The invention claimed is:

1. An inductorless AC/DC converter having an AC input node and a DC output node, the AC/DC converter comprising:
   a switch connected between the AC input node and the DC output node;
   a filter capacitor connected to the DC output node;
   a bistable that turns on the switch in a first bitstable state and turns off the switch in a second bitstable state; and
   a controller, wherein:
      the bistable is placed in the first bistable state to turn on switch S when the controller determines that a rising magnitude input voltage at the AC input node reaches the output voltage at the DC output node; and
      the bistable is placed in the second bistable state to turn off switch S whenever the controller determines that the output signal at the DC output node is greater in magnitude than a reference signal.

2. The AC/DC converter of claim 1, wherein the bistable is reset when the controller determines that the output voltage at the DC output node is greater in magnitude than a reference voltage.

3. The AC/DC converter of claim 1, wherein the bistable is reset when the controller determines that the output current at the DC output node is greater in magnitude than a reference current.

4. The AC/DC converter of claim 3, wherein the controller regulates current at the DC output node for LED lighting.

5. The AC/DC converter of claim 1, wherein the controller regulates a negative output voltage or current at the DC output node.

6. The AC/DC converter of claim 1, wherein the input waveform at the AC input node is a sawtooth, or a triangle wave, or other non-sinusoidal form.

7. A method for control of an inductorless AC/DC converter having an AC input node and a DC output node, the method comprising:
   (a) detecting that an increasing magnitude input voltage at the AC input node reaches an output voltage at the DC output node, and turning on a switch to transfer energy from the AC input node to the DC output node in response to the detecting; and
   (b) detecting whether the magnitude of the output voltage at the DC output node is greater than a regulation voltage, and turning off the switch to transfer energy from the AC input node to the DC output node when the magnitude of the output voltage is greater than the regulation voltage.

8. A method for control of an inductorless AC/DC converter having an AC input node and a DC output node, the method comprising:
   (a) detecting that an increasing magnitude input voltage at the AC input node reaches an output voltage at the DC output node, and turning on a switch to transfer energy from the AC input node to the DC output node in response to the detecting; and
   (b) detecting whether the magnitude of the output current at the DC output node is greater than a regulation current, and turning off the switch to transfer energy from the AC input node to the DC output node when the magnitude of the output current is greater than the regulation current.

9. The method of claim 8, when used for regulating LED lighting.

* * * * *